United States Patent [19]

Buffington

[11] 4,431,214
[45] Feb. 14, 1984

[54] DATA GUIDE DEVICE

[75] Inventor: Veronica A. Buffington, Irvington, N.J.

[73] Assignee: Federal Paper Board Co., Inc., Montvale, N.J.

[21] Appl. No.: 187,569

[22] Filed: Sep. 15, 1980

[51] Int. Cl.³ .................... B42D 15/00; G09F 11/00
[52] U.S. Cl. ...................................... 283/65; 40/491; 428/542; 493/355; 493/399
[58] Field of Search .................... 283/44, 65, 6, 61; 40/489, 490, 491; 281/2; 434/172, 405; 493/944, 959, 355, 354, 399, 398, 397; 428/542; 282/22 R

[56] References Cited

U.S. PATENT DOCUMENTS

| | | | |
|---|---|---|---|
| 3,058,401 | 10/1962 | Cross | 493/944 X |
| 3,081,111 | 3/1963 | Kehoe | 282/22 R |
| 3,562,940 | 2/1971 | Gulbransen | 40/491 |
| 3,593,443 | 7/1971 | Demetrius | 283/6 X |
| 3,758,136 | 9/1973 | Guyer | 281/31 X |
| 3,902,656 | 9/1975 | Rothchild | 229/75 |
| 4,233,768 | 11/1980 | Bromberg | 283/65 X |
| 4,262,939 | 4/1981 | Schoettle | 283/65 |

Primary Examiner—James M. Meister
Assistant Examiner—John S. Brown
Attorney, Agent, or Firm—August E. Roehrig, Jr.

[57] ABSTRACT

The disclosed device comprises a pair of hingedly connected pocket formations receiving data cards which are derived by folding and connecting a plurality of initially integral panels, the panels being formed by cutting and scoring a blank of paperboard of relatively light gauge, and thereafter being folded and secured so as to provide the hingedly connected pocket formations in each of which an end panel of the blank forming the data card is confined and is accessible through an open end so as to enable it to be torn loose and to be moved to different positions in the pocket thereby enabling data imprinted thereon to be viewed through window openings in a wall forming panel on which related data may be imprinted.

6 Claims, 7 Drawing Figures

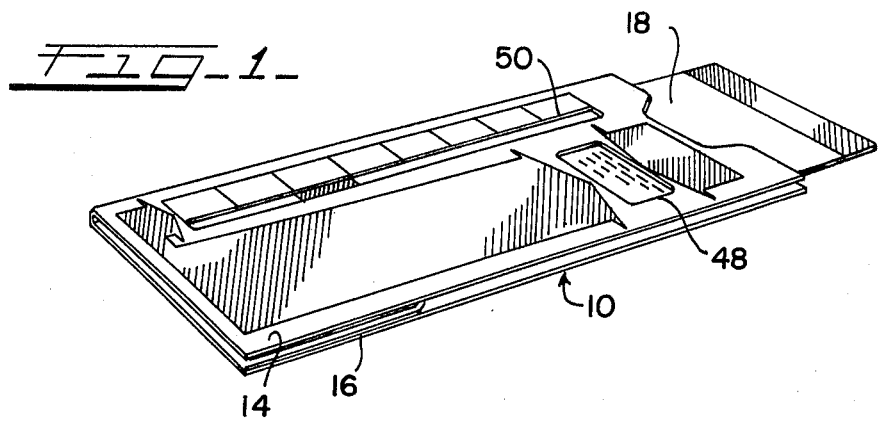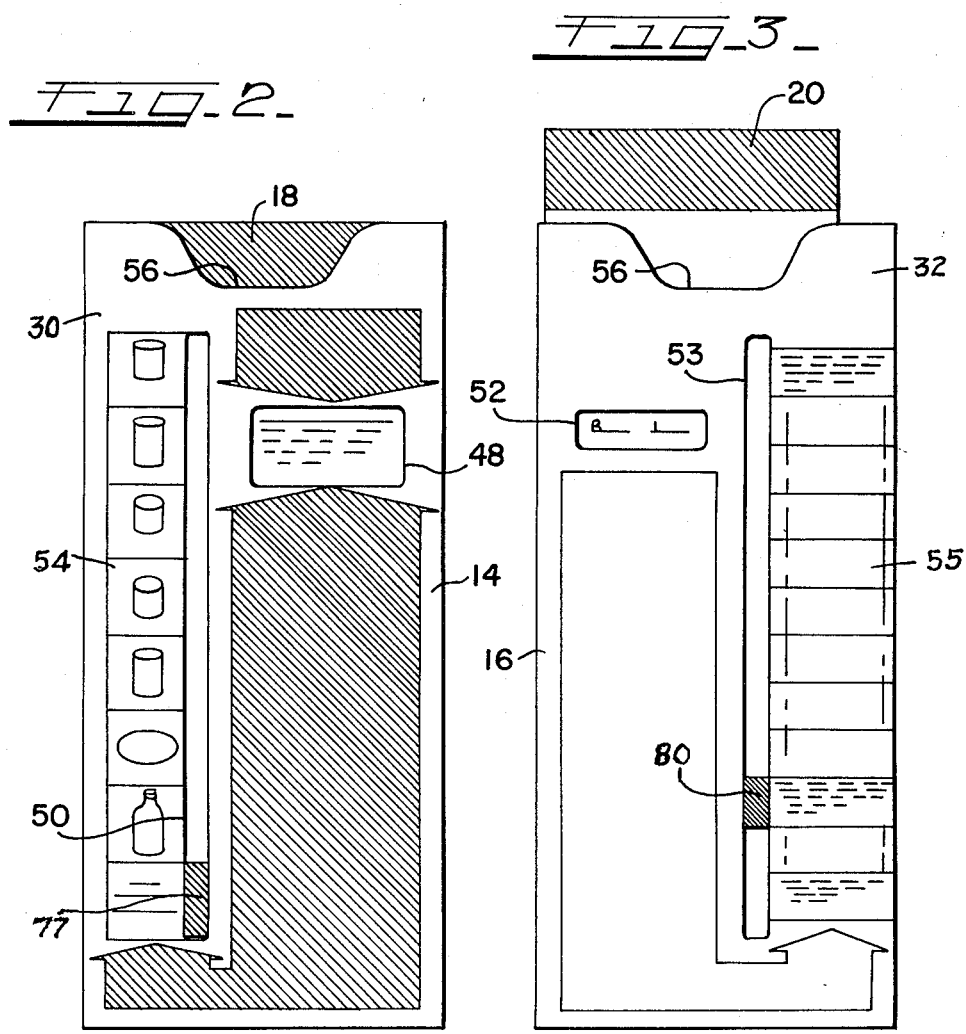

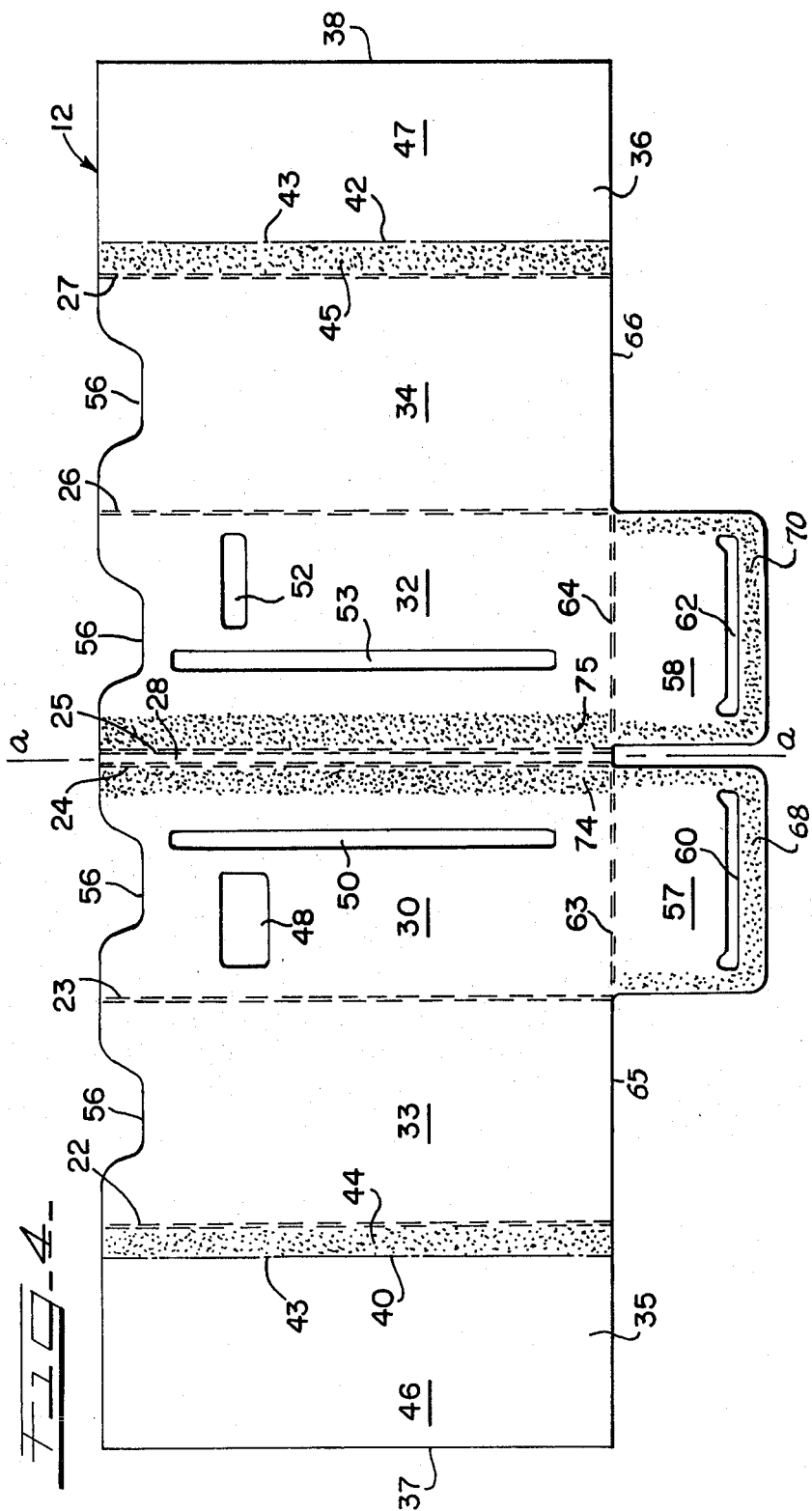

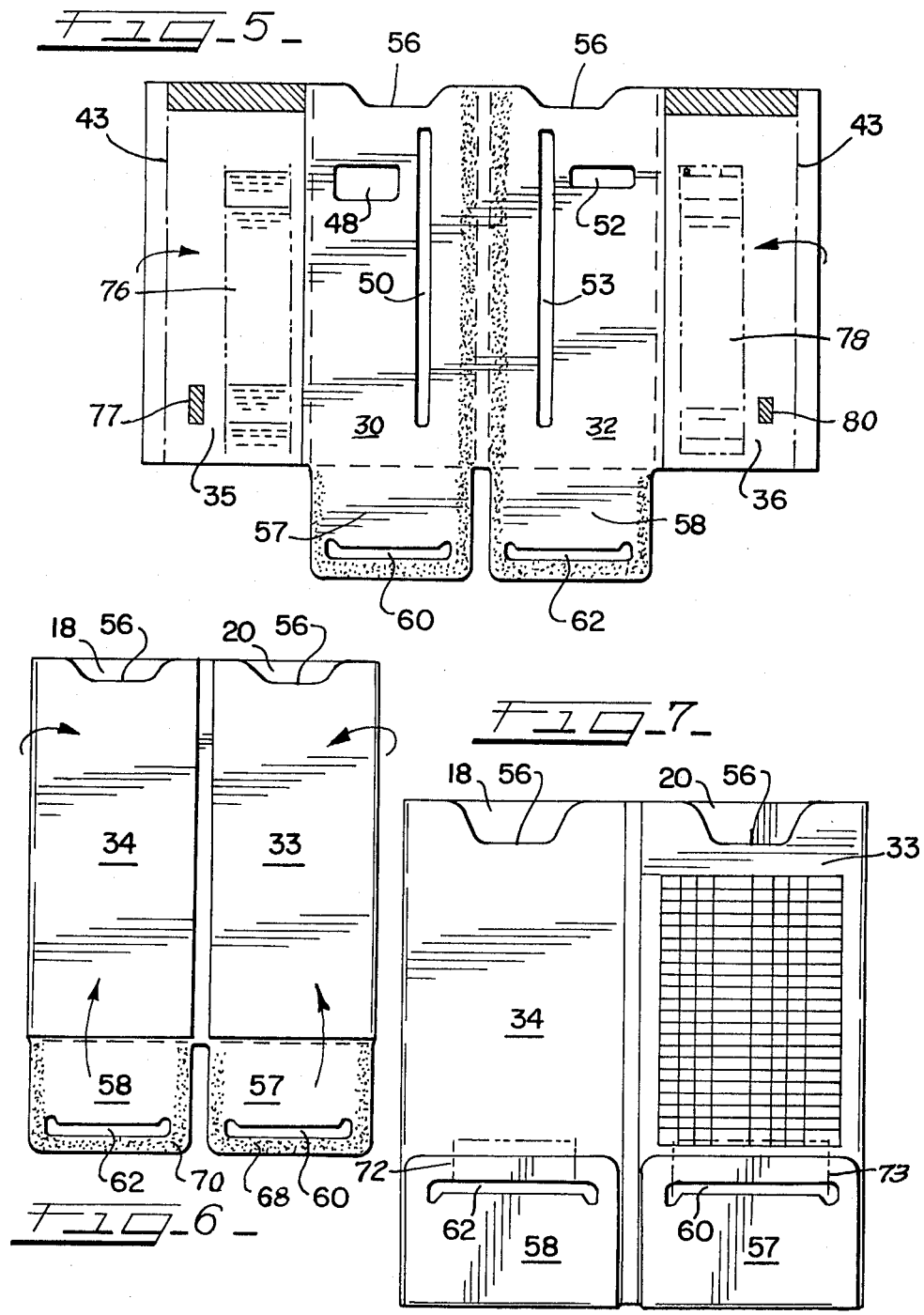

DATA GUIDE DEVICE

BACKGROUND OF THE INVENTION

This invention relates to hand held devices in the form of an envelope encased slide member for computing or comparing values, and determining related data of various kinds and is more particularly concerned with improvements in devices of such character which may be formed of paperboard or similar foldable sheet material.

Various types of hand held devices have been developed in which a slide member is incased in movable relation in an envelope which is apertured so as to observe through an aperture answers to a series of questions or conditions which are carried in spaced relation on the slide member and which may be positioned selectively in an associated aperture by movement of the slide member. Various arrangements of this type have been devised wherein a slide member carrying a series of questions or informative data and an indicator is movable to position individual questions or data for observation through an opening in the face of a pocket forming shield member and to position the indicator for observation through another aperture having related data or information associated with the same. Generally, the prior devices have been formed of relatively expensive materials which has limited their acceptability for purposes such as advertising or premium items.

A general object of the present invention is to provide a device of the types described which may be formed of paperboard or similar foldable sheet material at relatively low cost so as to make it more acceptable for a greater variety of marketing purposes than metal or plastic devices of similar character.

A more specific object of the invention is to provide a device of this character which may be initially formed of a single sheet of paperboard, or similar foldable sheet material, which is cut and scored so as to divide it into a series of connected panels which are folded and secured in pocket forming relation with one or more slide panels each of which is encased in a pocket formation and arranged so that it may be broken loose for slidable manipulation in the pocket.

A still more specific object of the invention is to provide a data supplying device of the character described which may be formed from a single cut and scored blank of paperboard, or similar foldable sheet material, so as to provide a pair, or more, of hingedly connected slide accommodating pocket formations with apertures in the outside faces of panels forming the pockets for observing data or information on slide members in the pockets and other apertures exposing indicators on the slide members, which are adapted, to move in the apertures when the slide members are moved so as to indicate related information or data imprinted on the panel surfaces adjoining the apertures.

A further object of the invention is to provide a data guide device of the character described which is particularly adapted for fabrication from a single sheet of paperboard, or the like, and which is in the form of a folder with hinged pocket formations in which slidable data bearing panels are mounted, with the slidable panels having data arranged thereon, so as to enable a panel to be moved in its pocket and display selected data in an aperture in the outside wall of the pocket, which wall has an associated aperture for observing related data carried on the data panel or an indicator thereon which will point to related data imprinted along the side of the aperture in which the indicator is adapted to move.

The invention which is illustrated and claimed herein comprises an envelope or folder formed from paperboard, or the like, in which one or more pocket formations are provided with a data cord, or slide member, which is initially trapped in the pocket and which may be released for sliding movement in the pocket by a tearing action, the card being adapted to have imprinted thereon a series of questions, or the like, and answers to the questions or related information, or an indicator member, so that the card may be moved to selectively position individual questions, or the like, for observation in an aperture in an outside wall of the pocket with the answers appearing in an associated aperture in the wall or identified by movement of the indicator member in the associated aperture.

The foregoing and other objects and advantages of the invention will become more apparent when reference is made to the accompanying detailed description of the preferred embodiment of the invention which is set forth in the accompanying drawings wherein like reference numerals indicate corresponding parts throughout.

BRIEF DESCRIPTION OF THE DRAWINGS

FIG. 1 is a perspective view of a device which embodies the principles of the invention and which comprises a double pocket information folder with a data bearing slide member partially withdrawn from the one pocket formation.

FIG. 2 is a plan view showing the one outside face of the information folder of FIG. 1.

FIG. 3 is a plan view showing an opposite outside face of the information folder of FIG. 1 with the data slide card partially withdrawn from its pocket.

FIG. 4 is a plan view of the inside face of a paperboard blank which is cut and scored preparatory to the fabrication of the device of FIG. 1.

FIG. 5 is a plan view of the cut and scored blank of FIG. 4 showing the initial folding steps.

FIG. 6 is a plan view illustrating a further folding step in forming the device; and FIG. 7 is a plan view showing the inside faces of the complete folder members in open position.

DESCRIPTION OF A PREFERRED EMBODIMENT OF THE INVENTION

Referring to the drawings there is illustrated in FIG. 1 an information and record keeping device 10 which is adapted to be formed from the cut and scored paperboard blank 12 which is illustrated in FIG. 4 and which, in the form illustrated, is especially adapted to be supplied by the manufacturer to customers for use in connection with the marketing of a motor oil and associated motor maintenance products. While the illustrated form of the device is particularly adapted for such purpose it will be understood that the device incorporates features which may be incorporated in a different form of the device which will be useful in connection with other marketing projects, or the like.

The illustrated device 10 comprises hingedly connected panel assemblies 14 and 16, each of which includes a pocket formation having one end open and a data panel 18, 20 mounted therein. The data panels are slidable in the pockets and each has imprinted thereon data, and related data, or information, or an indicator, so that the data may be read, or the indicator member observed, through associated apertures disposed in the outside face panels of the panel assembles 14 and 16, the latter having, for example, imprinted adjacent the one aperture an associated series of answers to questions on the slide panel, so that movement of the slide panel positions a question in an aperture and moves an indicator on the slide panel to a position in the associated aperture to indicate the answer to the question.

The blank 12 as illustrated in FIG. 4, comprises a single integral paperboard sheet of generally rectangular form which is divided into a series of rectangular panels on longitudinally spaced, parallel lines 22, 23, 24, 25, 26 and 27, extending transversely of the blank. The blank 12 is cut and scored so that it is generally symmetrical about the transverse center line a—a. The parallel lines 24 and 25 on opposite sides of the line a—a are closely spaced score lines which define between them a narrow hinge panel 28, the latter connecting outside face panels 30 and 32 which are defined by the score lines 23, 24 and 25, 26, respectively. The panels 30 and 32 are of equal size and of substantial dimension in the lengthwise direction of the blank. The adjoining panels 33, 34 which are defined by the score lines 22, 23 and 26, 27, respectively, have a dimension longitudinally of the blank which is only slightly less than the corresponding dimension of the panels 30, 32. The end panels 35, 36 which extend from the score lines 22 and 27 to the end edges 37, 38 of the blank have a dimension in the lengthwise direction of the blank which is somewhat less than the corresponding dimension of the panels 33, 34.

The blank is cut on the transverse lines 40 and 42 which are parallel with and spaced a short distance outward of the score lines 22 and 27, respectively, with the cutting on the lines 22 and 27 being interrupted at intervals so as to leave a small number of connecting "nicks" 43 which are easily broken by a shearing action as hereinafter described. The narrow panels 44, 45 between the cutting lines 40, 42 and the associated score lines 22, 27 provide glue areas or glue panels which, in fabricating the device, serve to adhesively secure the margins of the panels 35, 36 to the adjoining panels 33, 34 upon folding on the score lines 22, 27, while leaving the data slide panel forming portions 46, 47 free of adhesive so that the latter may be readily freed for use by breaking the connecting nicks 43 and become the data bearing slide panels 18 and 20 in FIGS. 1 to 3.

The two center panels 30, 32, which become outside panels in the panel assemblies 14 and 16 of FIGS. 1 to 3, are provided with pairs of apertures 48, 50 and 52, 53 for observing data and indicators imprinted on the slide panel forming portions 46 and 47 of the end panels 35 and 36 of the blank. The apertures 48 and 52, which are rectangular in configuration, are positioned near the top portions of the panels 30 and 32 and at approximately equal distances from the line a—a. The size or dimensions of the apertures 48 and 52 will be determined by the location and character of the data which is imprinted on the slide panel forming portions 46 and 47 of the blank. The associated apertures 50 and 53, which are elongate and which extend transversely of the blank for a major portion of the transverse dimension, are spaced a predetermined distance from the center line a—a of the blank so as to leave space for imprinting data or other information material along the side margin of the outside faces of the panels as indicated at 54 and 55 in FIGS. 1 to 3. The panels 30, 32 and the adjoining panels 33, 34, which cooperate with the panels 30, 32 in forming the slide receiving pockets are notched out at 56 along the margin of the blank. When the slide receiving pockets are formed by folding the panels 33 and 34 onto the panels 30 and 32 the notched out portions 56 are aligned at the open mouth of each pocket and enable the slide panel members 18 and 20 to be grasped between the fingers of the user. At the opposite side of the blank 12 the apertures 50 and 53 may be relatively narrow in the form shown but have sufficient width to observe the position of an indicator member 58, 60 (FIGS. 2, 3) on the outside faces of the slide panel forming portions 46 and 47 of the endmost panels 35 and 36. Two center panels 30 and 32 have small rectangular extension panels 57 and 58 which have elongate apertures 60 and 62 extending in the outer margins thereof. These panels are adapted to hinge or fold on the longitudinal score lines 63 and 64 which are aligned with the cut edges 65 and 66 of the panels 33, 35 and 34, 36 and to be adhesively secured around the three cut edges to the inside panels 33 and 34 as shown in FIG. 7. The two panels 57 and 58 are separated from each other by cutting out a slot 67 which straddles the transverse center line a, a and which is slightly wider than the hinge strip 28. The adhesive for securing the panels 57 and 58 is applied in relatively narrow marginal areas 68 and 70 leaving the areas inboard of the slots 60, 62 free of adhesive so that the slots 60, 62 provide openings for entrance to the pockets which are formed, for storing receipts or the like, as indicated at 72 and 73 in FIG. 7.

The folding of the cut and scored blank 12 is illustrated in FIGS. 5, 6 and 7. An adhesive is applied to the areas 44, 45 on the inboard margins of the panels 35 and 36. Adhesive may also be applied in narrow strips 74 and 75 to the adjacent margins of the center panels 30 and 32 with the strips 74 and 75 extending along the score lines 24 and 25 and having a width no greater than the width of the panels 44 and 45. The end panels 35 and 36 are folded on the score lines 22 and 27 which brings the printed side of the slide panel forming portions 46 and 47 uppermost and secures the narrow panels 44 and 45 to marginal portions of the panels 33 and 34. The printed matter, in the form illustrated comprises a series of vertically spaced statements 76 along one side of the panel 35 regarding the products listed or pictured on the outside face of the panel 30 and indicated at 54 (FIG. 2) together with a colored indicator configuration 77 near the bottom margin of the panel. The statements 76 and the indicator 77 are located so that when the folded panels 33, 35 are further folded on the hinge score line 23 onto the apertured panel 30 and the panel portion 46 is broken loose so that it becomes slide panel 18 it can be moved in the slide pocket formed between the panels 30 and 33 to position selected statements 76 in the aperture 48 with the indicator 77 moving to the proper position to indicate the product 54 referred to. In like manner the panel portion 47 has printed on it a vertically spaced series of statements, data, questions or the like 78 and an associated indicator configuration 80 which are observed upon movement of the released slide panel 20 through the apertures 52 and 53 in the panel 32 upon which the folded panels 34 and 36 are further folded on the hinge score line 26. In the form shown the series of statements 78 relate to engine performance problems with the data 55 on the outside face of the apertured panel 32 providing answers to the problems which are pointed to be the indicator

I claim:

1. A hand held device for computing or comparing values or related information which is adapted to be formed on a sheet of paperboard or like material, and which comprises an envelope having a rectangular pocket and a card member disposed in said pocket, said card member being initially attached along one longitudinal edge thereof to a folded marginal portion on one of the panels forming a wall of the envelope pocket, the envelope pocket being closed on three sides with the fourth side open and providing access to grip the card member for moving the same, the card member being directly attached to a longitudinal edge of one of said panels such that said card member is carried within the confines of said pocket formed thereby prior to separation therefrom by means which are readily breakable by grasping the accessible end of the card member and exerting a pulling force in the direction of movement of said card member so as to permit the card member to be freed to slide in the pocket, said longitudinal edge of said panel to which said card member is directly attached contacting said card upon the separation of said card member therefrom for guiding the movement of said card member in and out of the envelope pocket when said card member has been freed to slide therein, said wall forming panel having spaced apertures therein which render visible spaced portions of the surface of the card member and said card member having thereon a line of information data which will register with one of the wall apertures upon selected movement of said card member, and having an indicator which is located thereon so as to move, upon movement of said card member, to different positions in registry in the associated wall aperture.

2. A data card folder device for computing or comparing values or related information which is adapted to be formed of a cut and scored sheet of paperboard, or the like, which device comprises an envelope folder formed by integrally connected panels, which have been folded and connected so as to provide a pair of hingedly connected pocket formations each with one end thereof open, and a data card disposed in each pocket formation which is initially integrally connected along one longitudinal side thereof to a longitudinally extending hinge portion of one of the encompassing pocket forming panels and which is readily releasable when said paperboard is erected to form said data card device by pulling on the end of the data card in the direction of card movement when released therefrom thereby shearing the data card from said hinge portion the data card being thereafter slidable in the pocket, said longitudinally extending hinge portion to which said data card is initially integrally connected contacting said data card upon shearing of the data card from said hinge portion for guiding the sliding movement of said data card in the pocket when said data card has been released to slide therein, each data card having imprinted thereon a series of data statements and a lateral spaced indicator member and apertures in an associated pocket forming panel aligned so as to render visible selected data statements and the indicator imprinted on the data card when the latter is moved to different positions in its associated pocket.

3. A data card device as set forth in claim 2 wherein said envelope forming panels are rectangular and said pocket formations are each derived by connecting side margins of a pair of said panels and providing an integral panel at one end which is folded onto the outside face of an associated pocket forming panel and secured along the side edges thereof.

4. A data card device as set form in claim 2 wherein said envelope forming panels are rectangular and said pocket formations are connected in hinged relation by a relatively narrow spacing panel.

5. A blank for forming a data guide device which is in the form of a cut and scored sheet of foldable paperboard material and which is divided into a series of rectangular panels by transversely spaced parallel longitudinally extending score lines, said panels comprising a narrow central hinge forming panel, adjoining pairs of pocket forming panels and data bearing end panels which are attached directly to and separated from the outermost pocket forming panel by a narrow glue panel area defined by pair of parallel, spaced longitudinally extending lines the innermost one of which is a hinge score line and the outermost one of which is weakened so that it may be readily broken by exerting a pulling force on the end most panel in the direction of movement of said end most panel when severed therefrom, said outermost longitudinally extending line by which said data bearing end panels are attached directly to and separated from the outermost pocket forming panel contacting said data bearing end panels upon the severing of said data bearing end panels therefrom for guiding the movement thereof in and out of the pocket when erected, said data bearing end panels lying within the confines of said adjoining pairs of pocket forming panels when erected and prior to separation therefrom, each end most panel having a dimension extending from the readily broken line to the end edge of the blank which is less than the dimensions of the pocket forming panels in the lengthwise direction of the blank.

6. A blank as set forth in claim 5 wherein the material at said readily broken line is cut and scored so that resulting perforations are separated by short length connecting portions which are readily broken by a relatively small pulling force on the end panel in the direction transverse of the blank.

* * * * *